United States Patent [19]

O'Blasny

[11] 4,071,438

[45] Jan. 31, 1978

[54] METHOD OF RECLAIMING WASTE OIL BY DISTILLATION AND EXTRACTION

[75] Inventor: Richard H. O'Blasny, Overland Park, Kans.

[73] Assignee: Vacsol Corporation, Kansas City, Kans.

[21] Appl. No.: 692,443

[22] Filed: June 3, 1976

[51] Int. Cl.² .............................................. C10M 11/00
[52] U.S. Cl. ..................................... 208/180; 208/184
[58] Field of Search .................................. 28/180, 184

[56] References Cited

U.S. PATENT DOCUMENTS

| | | | |
|---|---|---|---|
| 1,988,773 | 1/1935 | Baender | 208/185 |
| 2,162,195 | 6/1939 | Greensfelder et al. | 208/180 |
| 3,639,229 | 2/1972 | Brownawell et al. | 208/184 |
| 3,763,036 | 10/1973 | Jordan et al. | 208/180 |
| 4,021,333 | 5/1977 | Habiby et al. | 208/179 |

*Primary Examiner*—Delbert E. Gantz
*Assistant Examiner*—James W. Hellwege
*Attorney, Agent, or Firm*—Schmidt, Johnson, Hovey & Williams

[57] ABSTRACT

An effective method of reclaiming or re-refining modern-day, additive-supplemented waste oils such as those derived from gasoline or diesel engine crankcases is provided which achieves substantial oil purification at relatively low cost and without creation of waste disposal problems common to conventional methods such as those involving clay and acid treatment. The method hereof includes the steps of dehydrating and fractionating the waste oil to remove water and the light ends, followed by vacuum distillation to give various grades of oil and solvent treatment with a solvent such as nitrobenzene to remove substantially all undesirable impurities from the oil. Reclaimed oil is thereafter recovered by steam stripping techniques which also allows collection and reuse of the solvent, in order to materially reduce operational costs.

8 Claims, 1 Drawing Figure

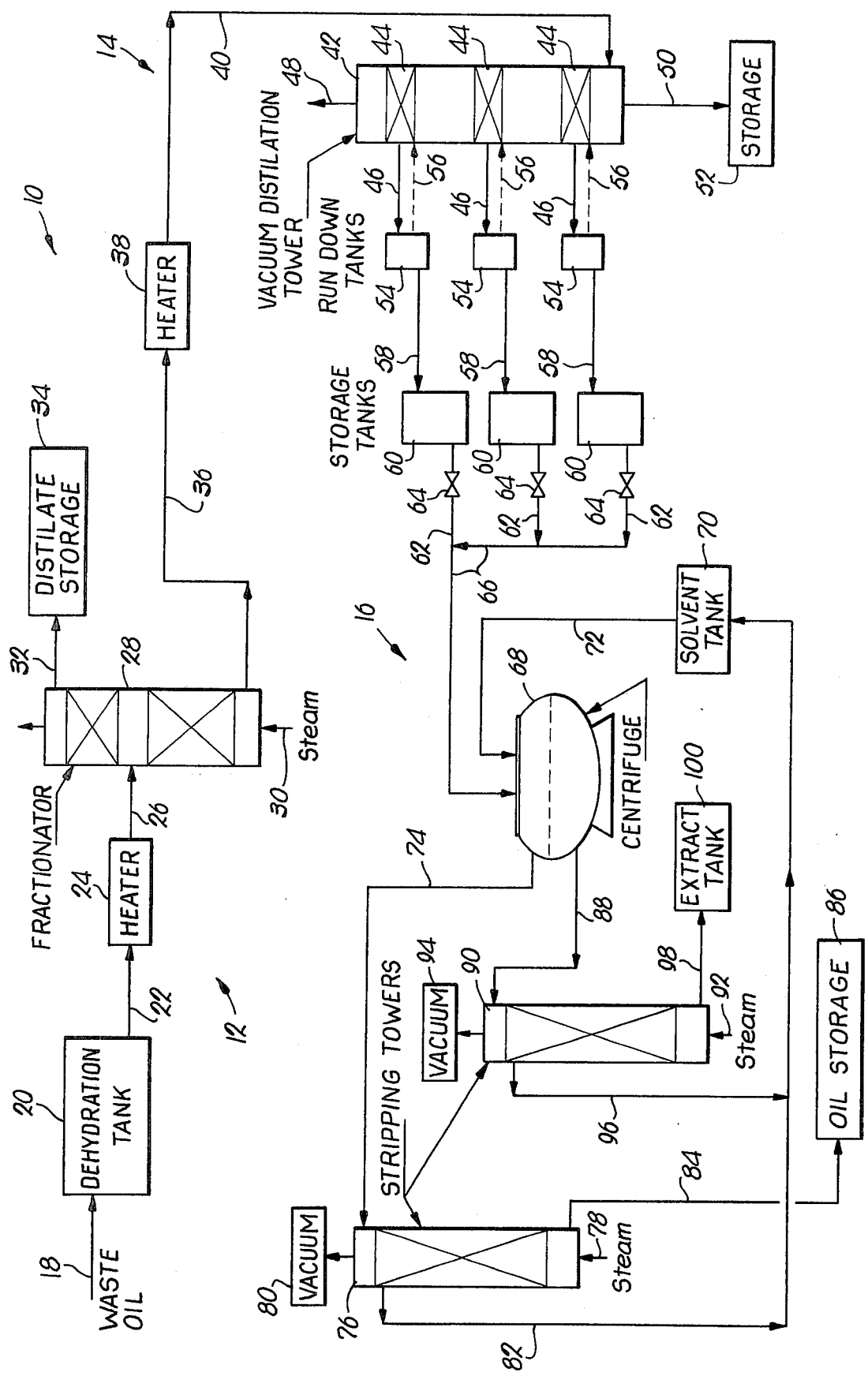

METHOD OF RECLAIMING WASTE OIL BY DISTILLATION AND EXTRACTION

This invention relates to a novel method of reclaiming a wide variety of waste oils, and particularly modern-day oils which contain additives such as detergents and V.I. improvers. More particularly, it is concerned with such method which involves both fractional and vacuum distillation of the waste oil and selective solvent treatment in order to remove a large percentage of undesirable impurities from the waste oil and permit reuse of the solvent in order that the process costs are reduced and pollution problems minimized.

Various methods have been proposed in the past for reclaiming or re-refining waste oils such as those derived from internal combustion engines, old transformers, or other machinery. It is known that removal of a substantial portion of the impurities within such waste oil permits reuse thereof for a wide variety of purposes. Of course, recent energy source shortages have accentuated the need for oil conservation and accordingly, methods of reclaiming waste oil have received renewed attention.

One problem inherent in reclaiming modern-day waste crankcase oils resides in the fact that such oils are conventionally provided with additives such as detergents, dispersants, and V.I. improvers. These additives have in some instances made it difficult or impossible to adequately treat waste oil by simple, well-known procedures, since the additives tend to inhibit separation of impurities such as naphthenic, aromatic and asphaltic from the reusable waste oil. Thus, workers in the art of waste oil reclamation have been searching for ways to adequately and inexpensively re-refine modern-day waste oils which contain such potentially interfering additives.

Another problem commonly associated with conventional waste oil treatment processes involves the creation of a significant amount of pollution in the form of spent materials. For example, in certain known processes waste oil is treated with acid and clay in order to remove impurities; however, as a consequence of this treatment, large quantities of waste acid sludge and clay are produced, and create a disposal problem. Hence, while such processes can, in some instances, produce acceptable quality reclaimed oil, the waste disposal problem created as an adjunct thereof is significant.

A number of proposals have been made in connection with providing a process for effectively and economically reclaiming waste oils. Although certain of these processes have achieved a degree of commercial success, none have provided complete answers to the problems described above. In any event, exemplary processes are described in U.S. Pat. Nos. 2,162,195, 2,529,310, 3,607,731, 3,620,967, 3,625,881, 3,639,229, 3,791,965, 3,879,282, and 3,930,988.

It is therefore the most important object of the present invention to provide a process for easily and inexpensively reclaiming modern-day waste oils which overcomes many of the problems associated with the presence in the oil of detergents and other oil additives, while also substantially eliminating the problems of waste disposal attendant to known conventional re-refining processes, such as those involving acid sludge and clay treatment.

Another object of the invention is to provide an effective, relatively low cost waste oil reclamation process which includes the steps of dehydrating and removing the light ends from the waste oil, followed by vacuum distillation and solvent treatment of the oil to substantially remove undesirable impurities, such as naphthenic, aromatic and asphaltic therefrom, whereupon the oil can be recovered by known separation methods and the solvent collected and reused; in this manner solvent losses and pollution problems are minimized, and essentially all of the valuable reclaimable oil is recovered for sale.

As a corollary to the foregoing, another object of the invention is to provide a process of the type described wherein the vacuum distilled oil fractions and solvent are contacted in a centrifuge for effecting separation of the oil and solvent into layers which can thereafter be treated with steam stripping techniques to completely separate the oil and solvent; centrifuging of the oil-solvent admixture serves to enhance quick separation of the oil and solvent in the layers and renders the process more economical.

In the drawing:

The single FIGURE is a schematic representation of the preferred apparatus used in conjunction with the present invention.

Apparatus 10 of the FIGURE broadly includes a preliminary treatment stage 12 for dehydrating and removing the light ends from waste oil, a vacuum distillation stage 14, and a solvent treating stage 16. As will be described in detail, waste oil is fed in serial order through the three treatment stages in order to substantially remove undesirable impurities therefrom and provide salable re-refined oil at relatively low cost.

In detail, preliminary treatment stage 12 includes an incoming waste oil line 18 connected to a heated dehydration tank 20 which serves to remove essentially all of the water from the waste oil. An output line 22 is connected between tank 20 and a heater 24 preferably in the form of a pipe still which serves to heat the dehydrated oil coming from tank 20. A line 26 extends from heater 24 to a fractionator 28 which is steam-fed through line 30. Fractionator 28 is operable to remove the light ends from the dehydrated oil fed thereto, with such light ends being taken off through line 32 for ultimate storage in tank 34.

Vacuum distillation stage 14 includes a line 36 extending from the bottom of fractionator 28 and connected to a pipe still heater 38. A line 40 extends from heater 38 to the bottom of vacuum distillation tower 42. The latter is of conventional construction and includes a plurality of vertically spaced trays 44, which facilitate distillation of the oil fed to the tower. For purposes of illustration three such trays have been depicted, but it is to be understood that essentially any number thereof could be provided, depending upon the degree of refinement desired. Three sidestream lines 46 are connected to tower 42 adjacent the spaced trays 44 for the purpose of withdrawing the distilled cuts of oil produced in tower 42. In addition, an overhead vapor line 48 is provided with tower 42, along with a bottoms line 50. The latter is connected to a storage tank 52 for the storage of heavy fuel oil derived from fractionation operations of tower 42.

Respective run-down tanks 54 are connected to corresponding sidestream lines 46 for the collection of the oil cuts. Separate reflux lines 56 are interconnected between each run-down tank 54 and a corresponding tray 44 for cold refluxing of a metered amount of the oil cut back to the trays in order to control internal conditions in the vacuum tower 42, all as is conventional in the art.

Three transfer lines 58 are also provided between the run-down tanks 54 and corresponding storage tanks 60 for each of the sidestream cuts. Thus, the various fractions of oil produced in tower 42 can be selectively stored in the tanks 60 as required until further processing can be accomplished. Separate product lines 62 are attached to each tank 60, with each line having a selectively operable valve 64 therein. As depicted in the FIGURE, the three product lines are interconnected by a line 66 which permits the various fractions to be subsequently treated, either singly or in combination, depending upon the properties desired in the final reclaimed oil.

Solvent treatment stage 16 includes a conventional centrifuge 68 connected to line 66 as shown so that the oil from the respective storage tanks 60 is delivered to the centrifuge for further processing. In addition, a solvent tank 70 is provided along with a solvent delivery line 72 leading to centrifuge 68. An upper oil recovery line 74 is connected to centrifuge 68 and leads to a steam stripping column 76. The latter is fed by a steam line 78, and also has a vacuum source 80 connected thereto for creation of reduced pressures within the column. A solvent recovery line 82 is connected to the upper end of column 76 and extends to solvent tank 70 for recycling of the oil solvent. An oil recovery line 84 is connected to the bottom of steam stripping column 76 and leads to a finished oil storage tank 86.

In a similar fashion, a bottom layer transfer line 88 is connected to the lower portion of centrifuge 68 and leads to the top of a steam stripping column 90. Column 90 is fed through steam line 92, and also has a vacuum source 94 connected thereto. A solvent recovery line 96 extends from the top of column 90 and interconnects with line 82 leading to tank 70. Finally, an extract line 98 extends from the bottom of column 90 to an extract tank 100.

In its broadest aspects, the present invention relates to a method of reclaiming waste oils which involves treating such oil to remove at least a portion of any water therein, and to remove the so-called light ends or low-boiling fraction. This is followed by vacuum distillation of the pretreated oil to yield a plurality of oil fractions having different boiling points. The respective fractions are then treated either singly or in common with a solvent for effecting separation of the oil and solvent into an oil-rich layer and a solvent-rich layer, whereupon the oil is recovered from the oil-rich layer.

One important feature of the present invention resides in the fact that solvent treatment after distillation has been found to substantially remove undesirable naphthenic, aromatic and asphaltic impurities in the distilled oil fractions. Thus, in broad terms, the selected solvent must be capable of solvating and removing these general types of impurities. In practice, solvents selected from the group consisting of nitrobenzene, furfural, phenol, analine, the lower alcohols, the ketones, β-chloroethyl-ethers and mixtures thereof have been found to be particularly advantageous. In the case of many waste oils such as crankcase-derived oil, nitrobenzene alone is useful, but any of the above-identified solvents are also effective.

In addition, it has been found that the ratio of solvent to oil during the solvent treatment step should be from about 0.05:1 to 2.5:1, more preferably from about 0.5:1 to 1.5:1, and most preferably about 1:1. These ratios have been discovered to give excellent removal of undesirable oil impurities without unwanted side effects.

In the treatment of waste oil in apparatus 10, the first step involves dehydration of the oil within tank 20. This is accomplished by heating of the oil to remove water and some undesirable particulate matter such as dirt and suspended solids. Tank 20 is preferably of conventional conical bottom construction and includes heating means for heating the oil therein to a temperature within the range of from about 150° to 250° F. The pressure is generally at atmospheric during this dehydration step.

Essentially moisture-free oil is then charged to pipe still heater 24 where it is heated to a temperature of from about 525° to 575° F. and a pressure of from about 3 to 5 psig. This heated oil is fed to steam-fed fractionator 28 whereupon approximately 1% to 10% of the oil is steam stripped overhead as light ends. This overhead is thereafter condensed and any excess water is drawn off, whereupon the light ends are fed to distillate storage tank 34.

The bottoms from fractionator 28 are next fed to pipe still heater 38 and heated therein to a temperature of from about 700° to 830° F., at a pressure of 60 to 175 psig. These heated bottoms are then discharged to the feed plate of vacuum distillation tower 42.

Feed plate conditions within tower 42 are temperatures within the range of from about 680° to 730° F. and pressures ranging from about 10 to 50 mm. Hg, absolute. Eighty to ninety percent of the charge is normally vaporized upwardly through the tower where sidestreams are taken off at various locations in the known manner. The remainder of the unvaporized charge passes through bottoms line 50 to storage tank 52. These unvaporized bottoms comprise mainly heavy fuel oils. Also, all non-condensable oil gases, along with steam and air, are allowed to escape to the overhead recovery system via vapor line 48.

The respective sidestreams are drawn off through the corresponding sidestream lines 46, cooled and pumped to the corresponding run-down tanks 54. A certain amount of the sidestream products are normally pumped back to the trays as cold reflux in order to maintain control of the internal conditions within tower 42. In essence, the various sidestreams represent different grades of lubricating oils, and essentially any number of sidestreams or cuts can be drawn off of the tower.

The sidestream products within tanks 54 are transferred via lines 58 to the respective storage tanks 60 to await further processing. The sidestream products, at this point in the process, still need additional processing to improve their quality, although at this point they are purified to a substantial extent.

The next stage of the process involves solvent treatment of the vacuum sidestreams. As indicated above, the various sidestreams can be individually solvent treated, or, if a medium grade lubricating oil is desired, the fractions can be combined and treated together. In any event, at least one of the vacuum distilled oil fractions is mixed with a selected solvent within centrifuge 68. Time of contact between the solvent and oil should be sufficient to effect separation of the oil and solvent into an oil-rich upper layer and a solvent-rich lower layer. With a conventional industrial centrifuge, a contact time of from 1. to 5 minutes during centrifuging is generally sufficient. The centrifuge is normally operated at a temperature of from about 32° to 140° F., and at a pressure of approximately atmospheric.

Two distinct layers appear after sufficient contact is established between the vacuum distilled oil and solvent. The upper layer is rich in oil and characteristically would contain only about 1% to 5% solvent. This layer is fed through line 74 to stripping column 76. Steam fed through line 78 serves to strip the minor amount of solvent within the oil for ultimate return through line 82 to solvent tank 70. The bottoms from stripping column 76 represent purified and finished oil, and this is fed via line 84 to final product oil storage tank 86.

The lower centrifuge layer is rich in solvent with a minor amount of oil. In addition, the solvent has contained therein naphthenic, aromatic and asphaltic impurities derived from the distilled oil fractions. This second layer is fed through line 88 to stripping column 90 where it may be steam stripped to separate the extract oil from the solvent. As illustrated, the recovered solvent is transferred via lines 96, 82 to solvent tank 70, while the extract oil is transferred through line 98 to extract tank 100. Conditions within towers 76 and 90 are: a temperature of from about 200° to 275° F. and a pressure of from about 5 to 75 mm. Hg, absolute. In this connection, it is to be understood that in most cases column 90 would be operated only intermittently as necessary to remove extract oil carried with the circulating solvent. In those instances where the primarily solvent layer is not in need of stripping, it can be transferred directly to solvent tank 70.

The following example will illustrate the process in accordance with the present invention, but nothing therein is to be taken as a limitation upon the scope of the invention.

EXAMPLE

A quantity of crankcase-derived waste oil was treated in accordance with the method of the present invention. This oil had the following characteristics:

TABLE I

| WASTE OIL CHARACTERISTICS | |
| --- | --- |
| Flash Point | 360° F. |
| Viscosity at 100° F. S.S.U. | 342 |
| Viscosity at 210° F. S.S.U. | 59.6 |
| Viscosity Index | 135 |
| Gravity ° API | 24.4 |
| Color | Black |
| Pour Point | −35 ° F. |
| Neut. No. | 7.31 |
| Carbon | 5.20 |
| Ash Wt.% | 3.2 |

This waste oil was first dehydrated at a temperature of about 225° F. to drive off virtually all of the water and settle suspended solids within the oil. The dehydrated oil was next fractionated at a temperature of about 550° F. at a pressure of from 3 to 5 psig to remove the light ends, which were in turn sent to storage. The bottoms from the fractionation column had a viscosity at 100 S.S.U. of −443, a viscosity at 210 S.S.U. of −65.6 and a gravity °API of 26.5.

The fractionated oil was then vacuum distilled at 5 mm. Hg, absolute, and nine side cuts were drawn off. These side cuts had the following ASTM values:

TABLE II

| ASTM TEMPERATURES OF VAPORS | |
| --- | --- |
| ASTM % Volume | ASTM Temperatures |
| 10 | 420° F. |
| 20 | 445° F. |
| 30 | 465° F. |
| 40 | 483° F. |
| 50 | 500° F. |

TABLE II-continued

| ASTM TEMPERATURES OF VAPORS | |
| --- | --- |
| ASTM % Volume | ASTM Temperatures |
| 60 | 518° F. |
| 70 | 530° F. |
| 80 | 560° F. |
| 85 | 600° F. |

These fractionated cuts were handled in the manner described above. Nitrobenzene on a 1:1 volume basis with the oil was used and contacting was carried out for a period of about 5 minutes. Two distinct layers appeared in the settling tank, with the upper oil-rich layer being treated in a vacuum stripping column to separate the oil and solvent. The finished oil from this stripping operation yielded the following:

TABLE III

| SPECIFICATIONS OF FINISHED OIL | |
| --- | --- |
| Gravity ° API | 31.4 |
| Viscosity at 100 S.S.U. | 193 |
| Viscosity at 210 S.S.U. | 46.8 |
| Viscosity Index | 108 |
| Color | 1½ Lt. |
| Ash % Wt. | Nil |
| Flash Point | 425° F. |
| Pour Point | −20° F. |

Hence, it will be seen from the foregoing that the combination of vacuum distilling and selective solvent treatment of waste crankcase oil provides an efficient, inexpensive, and essentially polution-free reclamation method. As noted above, the method is also applicable to various other types of oils with only slight modifications which can be determined by one skilled in the art.

Having thus described the invention, what is claimed as new and desired to be secured by Letters Patent is:

1. A method of reclaiming additive-supplemented waste oil, comprising the steps of:
   providing a quantity of additive-supplemented waste oil having impurities therein;
   heat treating said waste oil to remove at least a portion of any water therein, and further treating the oil by fractional distillation to remove at least a portion of the light ends therefrom;
   removing a substantial portion of the impurities in the fractionally distilled waste oil by sequentially vacuum distilling the same to give at least one overhead fraction, and a bottoms fraction, said overhead fraction having a boiling point lower than that of said bottoms fractions, and thereafter contacting said overhead fraction with a quantity of nitrobenzene, the ratio of nitrobenzene to oil being from about 0.5:1 to 1.5:1, for effecting separation of the contacted oil and solvent into a first oil-rich layer and a second solvent-rich layer having a substantial portion of the impurities remaining in said overhead fraction dispersed therein; and
   recovering the oil from said first oil-rich layer.

2. The method as set forth in claim 1 wherein said ratio is about 1:1.

3. The method as set forth in claim 1 wherein the initial treating step includes the steps of dehydrating said waste oil by heating of the same, and fractionally distilling the dehydrated waste oil at a temperature of from about 525° to 575° F. and a pressure of from about 3 to 5 psig.

4. The method as set forth in claim 1 wherein said vacuum distilling includes the steps of preheating said treated oil to a temperature of from about 700° to 830°

F. and a pressure of from about 60 to 170 psig, distilling the preheated oil at a temperature of from about 680° to 730° F. and a pressure of from 10 to 50 mm. Hg, absolute, and drawing off sidestreams during said distilling to give a plurality of different boiling fractions.

5. The method as set forth in claim 1 including the step of contacting said overhead fraction and solvent in a centrifuge.

6. The method as set forth in claim 1 wherein said oil recovery includes the step of steam stripping said oil-rich layer under a vacuum to remove any solvent remaining therein.

7. The method as set forth in claim 1 including the step of steam stripping said solvent-rich layer to remove any oil remaining therein.

8. The method as set forth in claim 1 including the step of recovering said solvent after said contacting step.

* * * * *